United States Patent
Okazaki et al.

(10) Patent No.: US 11,807,250 B2
(45) Date of Patent: Nov. 7, 2023

(54) CONTROL APPARATUS FOR ELECTRIC MOTOR AND VEHICLE

(71) Applicant: TOYOTA JIDOSHA KABUSHIKI KAISHA, Toyota (JP)

(72) Inventors: Sho Okazaki, Toyota (JP); Takumu Honda, Okazaki (JP); Toshinori Okochi, Toyota (JP); Yasutaka Tsuchida, Toyota (JP); Yoshinori Ogami, Kariya (JP); Hiroki Nakane, Kariya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/660,311

(22) Filed: Apr. 22, 2022

(65) Prior Publication Data
US 2022/0340147 A1    Oct. 27, 2022

(30) Foreign Application Priority Data

Apr. 23, 2021   (JP) .................. 2021-073551

(51) Int. Cl.
| | |
|---|---|
| *H02K 9/19* | (2006.01) |
| *H02K 11/215* | (2016.01) |
| *H02K 11/25* | (2016.01) |
| *B60W 40/12* | (2012.01) |
| *B60W 30/18* | (2012.01) |
| *B60W 40/105* | (2012.01) |

(52) U.S. Cl.
CPC ...... *B60W 40/12* (2013.01); *B60W 30/18018* (2013.01); *B60W 40/105* (2013.01); *B60W 2510/087* (2013.01)

(58) Field of Classification Search
CPC . H02K 9/19; H02K 9/20; H02K 11/21; H02K 11/215; H02K 11/22; H02K 11/25
USPC .............................. 701/22; 180/65.1, 65.285
See application file for complete search history.

(56) References Cited

U.S. PATENT DOCUMENTS

| | | | |
|---|---|---|---|
| 9,876,461 B2 * | 1/2018 | Lee ..................... | H02P 27/08 |
| 10,428,682 B2 * | 10/2019 | Coldwate ............. | F01D 25/36 |
| 2011/0109256 A1 * | 5/2011 | Campbell .............. | H02K 11/20 |
| | | | 310/68 B |
| 2016/0344268 A1 | 11/2016 | Tsukamoto et al. | |

(Continued)

FOREIGN PATENT DOCUMENTS

| | | |
|---|---|---|
| EP | 2058941 A1 | 5/2009 |
| JP | 2013085388 A | 5/2013 |

(Continued)

*Primary Examiner* — Erick R Solis
(74) *Attorney, Agent, or Firm* — HUNTON ANDREWS KURTH LLP

(57) ABSTRACT

A control apparatus includes: a rotor temperature estimation unit estimating a temperature of a rotor based on stator temperature information from a first temperature sensor for identifying a temperature of a stator, refrigerant temperature information from a second temperature sensor for identifying a temperature of refrigerant used to cool an electric motor, and rotation speed information about the rotor from a resolver for identifying a rotation speed of the rotor; and an electric motor control unit controlling at least one of an output characteristic and a drive condition of the electric motor based on the temperature of the rotor estimated by the rotor temperature estimation unit.

4 Claims, 8 Drawing Sheets

(56) References Cited

U.S. PATENT DOCUMENTS

2019/0193576 A1* 6/2019 Kuroe .................... B60L 15/20
2020/0361304 A1* 11/2020 Takamatsu ............... H02K 9/19
2020/0391876 A1* 12/2020 Morrison ............... B64U 10/10

FOREIGN PATENT DOCUMENTS

| JP | 6026815 | B2 | 11/2016 |
| JP | 6740114 | B2 | 8/2020 |
| WO | 2021075186 | A1 | 4/2021 |
| WO | WO-2021075186 | A1 * | 4/2021 |

* cited by examiner

CONTROL APPARATUS FOR ELECTRIC MOTOR AND VEHICLE

CROSS REFERENCE TO RELATED APPLICATION

This application claims priority to Japanese Patent Application No. 2021-073551 filed on Apr. 23, 2021, which is incorporated herein by reference in its entirety including the specification, claims, drawings, and abstract.

TECHNICAL FIELD

The present disclosure relates to a control apparatus that controls an electric motor mounted on a vehicle. The present disclosure also relates to a vehicle provided with such a control apparatus.

BACKGROUND

Conventionally, as a control apparatus for an electric motor for a vehicle, there has been a control apparatus described in JP 6026815 B. The control apparatus is mounted on a vehicle provided with an electric motor that is cooled by cooling oil. The control apparatus is adapted to control output of the electric motor based on the temperature of the coil of a stator and the oil temperature of the cooling oil.

SUMMARY OF THE INVENTION

Permanent magnets that are embedded and fixed to the rotor of an electric motor are irreversibly demagnetized w % ben the temperature is higher than a predetermined temperature, and the performance of the electric motor is reduced. Further, since loss of the electric motor increases when the electric motor is rotating at a high speed, the amount of generated heat of the electric motor becomes large, and the temperature of the rotor easily becomes high. Therefore, it is necessary to control output of the electric motor when the electric motor is rotating at a high speed.

Under such a background, output control of an electric motor is performed without consideration of the rotation speed of the electric motor in the electric motor control of JP 6026815 B. Therefore, even when the electric motor is rotating at a low speed, it is necessary to perform control on the assumption of a high-speed rotation of the electric motor. Therefore, output of the electric motor is likely excessively limited in a low-speed rotation range of the electric motor, and it is difficult to cause the electric motor to operate efficiently in the low-speed rotation range of the electric motor.

Therefore, it is an advantage of the present disclosure to provide a vehicle control apparatus that easily causes an electric motor to operate efficiently, and a vehicle provided with such a control apparatus.

Solution to Problem

In order to solve the above problem, a control apparatus according to the present disclosure is a control apparatus for controlling an electric motor mounted on a vehicle, the control apparatus including: a rotor temperature estimation unit estimating a temperature of a rotor based on stator temperature information from a stator temperature identification unit for identifying a temperature of a stator, refrigerant temperature information from a refrigerant temperature identification unit for identifying a temperature of refrigerant used to cool the electric motor, and rotation speed information about the rotor from a rotation speed identification unit for identifying a rotation speed of the rotor; and a control unit controlling at least one of an output characteristic and a drive condition of the electric motor based on the temperature of the rotor estimated by the rotor temperature estimation unit.

Note that the above electric motor may be configured to be capable of generating motive power but not electric power. Or alternatively, the electric motor may be a so-called motor generator and configured to be capable of generating both of motive power and electric power.

Further, the above various kinds of temperature identification units may, of course, be temperature sensors installed on temperature detection targets, or may include one or more temperature sensors installed on parts other than the temperature detection targets, and a control unit that estimates temperatures of the temperature detection targets based on one or more temperatures detected by the one or more temperature sensors and information such as a map or a program (software) stored in a storage unit. Or alternatively, the above various kinds of temperature identification units may include one or more sensors other than the temperature sensors installed on the temperature detection targets, for example, one or more sensors among one or more temperature sensors that are not installed on the temperature detection targets, a current sensor, a voltage sensor and a rotation speed detection sensor, and a control unit that estimates the temperatures of the temperature detection targets based on one or more items of physical information detected by the one or more sensors, and the information such as the map or the program stored in the storage unit. In short, the above various kinds of temperature identification units may have any configuration capable of detecting or estimating the temperatures of temperature detection targets.

Further, the rotation speed identification unit may, of course, be configured with a rotation speed detection sensor that directly detects the rotation speed of the rotor, for example, a rotation speed detection sensor that includes a resolver and a pulsar ring, or the like, or may include one or more sensors other than the rotation speed detection sensor, for example, one or more sensors among a temperature sensor, a current sensor and a voltage sensor, and a control unit that estimates the rotation speed of the rotor based on one or more items of physical information detected by the one or more sensors, and information such as the map or the program stored in the storage unit. In short, the above rotation speed identification unit may have any configuration capable of detecting or estimating the rotation speed of the rotor.

According to the present disclosure, the control apparatus controls at least one of the output characteristic and the drive condition of the electric motor in consideration of the rotation speed of the rotor in addition to the stator temperature information and the refrigerant temperature information. Therefore, it is possible to prevent output from being excessively limited when the electric motor is rotating at a low speed, and it is possible to cause the electric motor to efficiently operate at both the time of rotating at a low speed and the time of rotating at a high speed.

Further, in the present disclosure, the rotor may include permanent magnets, and the control unit may control at least one of the output characteristic and the drive condition of the electric motor so that the permanent magnets are not demagnetized, based on the temperature of the rotor.

According to the present configuration, it is possible to effectively control or prevent demagnetization of the permanent magnets of the rotor.

Further, in the present disclosure, there may be provided an electric power source cutoff time identification unit identifying electric power source cutoff time during which an electric power source for the vehicle is cut off; and a start-up temperature estimation unit estimating a temperature of the rotor at the time of energizing the vehicle for which the electric power source cutoff time has ended, based on the electric power source cutoff time and a temperature of the rotor, estimated by the rotor temperature estimation unit, immediately before cutting off the electric power source.

According to the present configuration, it is possible to estimate the temperature of the rotor at the time of the vehicle being started up. Therefore, it is possible to cause the electric motor to efficiently operate from when the vehicle is started up, and it is possible to cause the electric motor to output a high torque from when the vehicle is started up. Therefore, it is possible to realize a motive power mechanism that is superior in responsiveness to an operation from when the vehicle is started up.

Further, though it is possible to estimate the temperature of the rotor using filtering, rate limit processing, or the like if a previous estimated temperature of the rotor may be identified, when the vehicle is started up, the previous estimated temperature of the rotor does not exist, and the temperature of the rotor cannot be highly accurately estimated. In comparison, according to the present configuration, it is possible to estimate the temperature of the rotor at the time of the vehicle being started up even when the vehicle is started up, and therefore, it is easy to highly accurately estimate the temperature of the rotor from when the vehicle is started up.

Further, a vehicle of the present disclosure includes the control apparatus of the present disclosure.

According to the present disclosure, it is possible to increase torque that an electric motor outputs when rotating at a low-speed.

Advantageous Effects of Invention

According to a control apparatus for an electric motor of a vehicle according to the present disclosure, it is possible to cause the electric motor to operate efficiently, and in particular, it is possible to increase torque that the electric motor outputs when rotating at a low speed.

BRIEF DESCRIPTION OF THE DRAWINGS

An embodiment of the present disclosure will be described based on the following figures, wherein.

DESCRIPTION OF EMBODIMENTS

Figure 1:
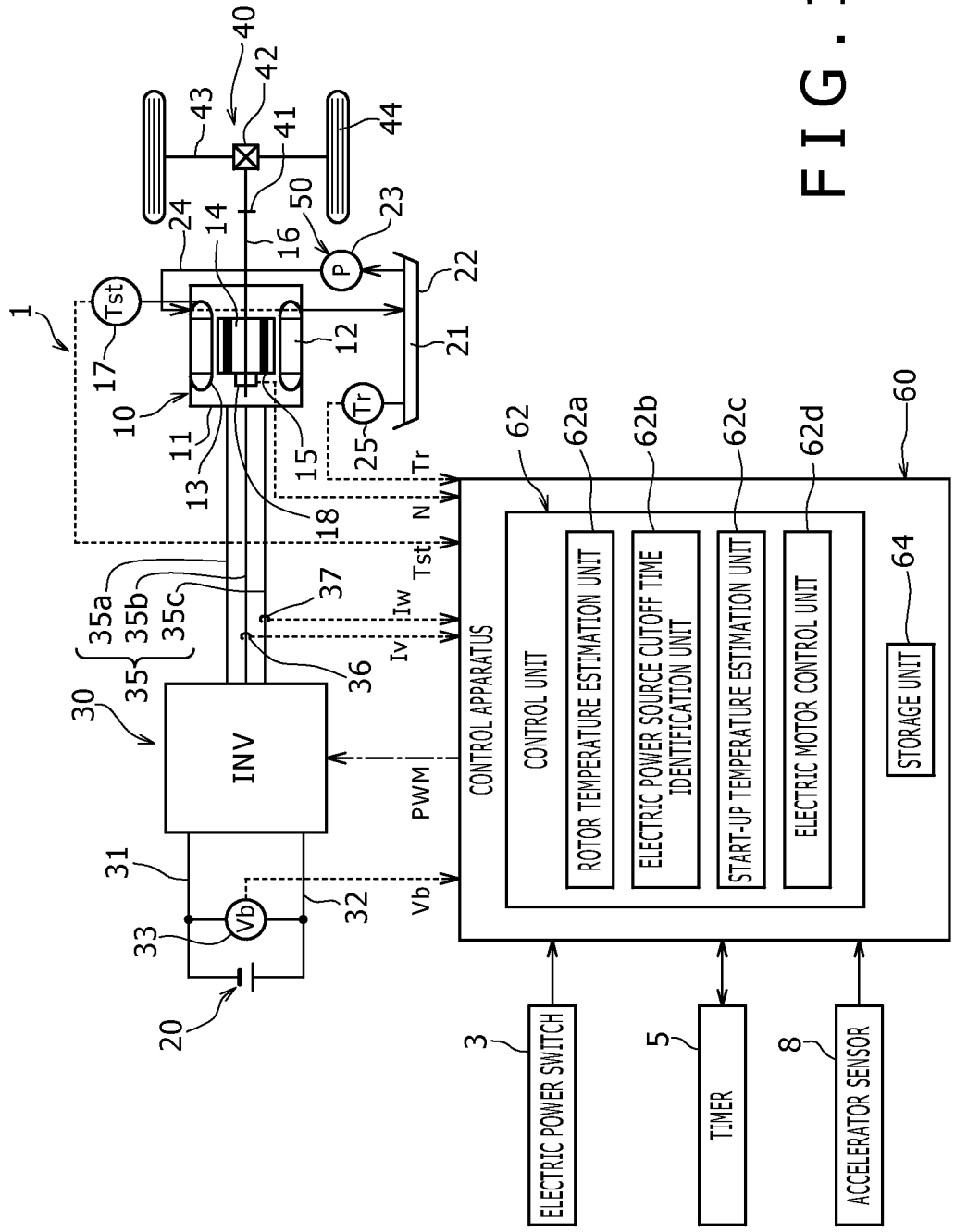
FIG. 1 is a schematic configuration diagram of an electric vehicle according to an embodiment of the present disclosure.

An embodiment according to the present disclosure will be described below in detail with reference to accompanying drawings. Note that when a plurality of embodiments and modifications are included below, it is assumed from the beginning that a new embodiment is constructed by appropriately combining feature parts thereof. Further, in the embodiment below, the same reference symbols are attached to the same components in the drawings, and duplicate description will be omitted. Further, among components described below, components that are not described in independent claims that show top concepts are arbitrary components, and are not indispensable components.

FIG. 1 is a schematic configuration diagram of an electric vehicle 1 according to an embodiment of the present disclosure. As shown in FIG. 1, the electric vehicle 1 is provided with an electric motor 10 for driving the vehicle, a battery 20 as an example of a power source for the electric vehicle 1, an inverter 30 that converts DC electric power of the battery 20 to AC electric power and supplies the AC electric power to the electric motor 10, a drive mechanism 40 that drives wheels 44 by rotational power generated by the electric motor 10, a cooling apparatus 50 that cools the electric motor 10, and a control apparatus 60 that controls output of the electric motor 10.

The electric motor 10 has a casing 11, a ring-shaped stator 12 attached in the casing 11, a rotor 14 arranged inward in the radial direction of the stator 12 with a space from the stator 12, and a rotation shaft 16 that has substantially the same central axis as the rotor 14 and that rotates synchronously with the rotor 14. A coil 13 is wound around the stator 12. A first temperature sensor 17 that detects a coil temperature Tst is attached to the coil 13.

The first temperature sensor 17 includes, for example, a thermistor element, the resistance of which depends on temperature, and a resin covering portion that covers the thermistor element. The first temperature sensor 17 may be attached to any position of the stator 12 and may be attached, for example, to a neutral line or the like when the coil 13 is Y-connected. Note that although description has been given for the case where the first temperature sensor includes a thermistor element, the temperature sensor may include a thermocouple, a platinum resistance temperature detector, or the like, or may include other temperature detection elements.

The rotor 14 includes, for example, a laminated structure with a cylindrical shape, in which a plurality of electromagnetic steel sheets are laminated. The rotor 14 further includes a plurality of permanent magnets 15 that are embedded and fixed inside on the outer circumference side of the cylindrical laminated structure and arranged at intervals in the circumferential direction. A resolver 18 is attached to one end of the rotation shaft 16. The resolver 18 is a rotation speed detection sensor that detects a rotation angle θ and a rotation speed N of the rotor 14. Note that although the resolver 18 is used to detect the rotation speed N of the rotor 14 in the present disclosure, any rotation speed detection sensor capable of detecting the rotation speed N of the rotor 14 may be used instead of the resolver 18. For example, a rotation speed detection sensor having a pulsar ring and a magnetism detection unit, or the like, may be used.

The battery 20 is a rechargeable and dischargeable secondary battery and is configured, for example, with a nickel-hydrogen battery, a lithium-ion battery, or the like. Each of the positive and negative electrodes of the battery 20 is electrically connected to the inverter 30 via a high voltage electric path 31 and a ground electric path 32. A voltage sensor 33 that detects a voltage Vb of the battery 20 is attached between the high voltage electric path 31 and the ground electric path 32.

The inverter 30 is internally provided with a plurality of switching elements that are configured with field effect transistors (FETs) or the like. The inverter 30 causes the switching elements to be turned on/off by a PWM signal inputted from the control apparatus 60, converts DC electric power from the battery 20 inputted from the high voltage electric path 31 and the ground electric path 32 to AC electric power, and supplies the AC electric power to the electric motor 10 via an AC electric path 35. Further, the inverter 30 causes the switching elements to be turned on/off by a PWM signal inputted from the control apparatus 60, converts AC regenerative electric power of the electric motor 10 inputted from the AC electric path 35 to DC electric power, and charges the battery 20 with the DC electric power via the high voltage electric path 31 and the ground electric path 32. The AC electric path 35 is configured with three electric paths of a U-phase electric path 35$u$, a V-phase electric path 35$v$ and a W-phase electric path 35$w$. A current sensor 36 that detects a V-phase current Iv is attached to the V-phase electric path 35$v$, and a current sensor 37 that detects a W-phase current 1$w$ is attached to the W-phase electric path 35$w$.

The cooling apparatus 50 has an oil pan 22 that is arranged below the electric motor 10 and retains coolant 21 such as cooling oil, an electric oil pump 23 that pressurizes the coolant 21 retained in the oil pan 22, a coolant circulation pipe 24 that causes the pressurized coolant 21 to circulate in the casing 11 of the electric motor 10, and a second temperature sensor 25 that detects a temperature Tr of the coolant 21 retained in the oil pan 22.

Note that although the second temperature sensor 25 is attached to the oil pan 22 and detects the temperature Tr of the coolant 21 in the present embodiment, the second temperature sensor 25 may be installed at any position if the temperature Tr of the coolant 21 can be detected, and may be installed, for example, on the electric oil pump 23. The second temperature sensor 25 may include, for example, a thermistor element, the resistance of which depends on temperature, and a resin covering portion that covers the thermistor element, may include a thermocouple, a platinum resistance temperature detector, or the like, or may include any other temperature detection element. The coolant 21 is pumped from the oil pan 22 by the electric oil pump 23 and flows into the electric motor 10 from an upper part of the casing 11 after passing through the coolant circulation pipe 24.

After cooling the coil 13 of the stator 12, the coolant 21 returns to the oil pan 22 from a lower part of the casing 11. The coolant 21 is collected at the lower part of the casing 11. A lower part of the stator 12 and a lower part of the rotor 14 are immersed in the coolant 21 collected in the casing 11. The drive mechanism 40 includes a drive shaft 41, a differential gear 42, and wheels 44. The drive shaft 41 is connected to the rotation shaft 16 of the electric motor 10, and driving force of the electric motor 10 is transmitted to the drive shaft 41. The differential gear 42 converts rotational power of the drive shaft 41 to rotational power to cause an axle 43 to rotate. The wheels 44 are attached to the axle 43 and rotate synchronously with the axle 43. The electric vehicle 1 is further provided with a vehicle electric power switch 3, a timer 5, and an accelerator sensor 8. The vehicle electric power switch 3 outputs a signal capable of identifying on/off of the power source for the electric vehicle 1, to the control apparatus 60, the timer 5 exchanges information with the control apparatus 60 in both directions, and the accelerator sensor 8 outputs a signal indicating an accelerator opening, to the control apparatus 60.

The control apparatus 60 is configured with a computer, for example, a microcomputer, and includes a control unit 62 and a storage unit 64. The control unit 62, that is, a processor, includes, for example, a CPU (Central Processing Unit). Further, the storage unit 64 is configured with a hard disk drive (HDD), semiconductor memories and the like, and the semiconductor memories are configured with a non-volatile memory such as a ROM (Read Only Memory) and a volatile memory such as a RAM (Random Access Memory). The storage unit 64 may be configured with only one storage medium or may be configured with a plurality of different storage media. The CPU reads and executes a program or the like stored in the storage unit 64 in advance. Further, the non-volatile memory stores a control program, predetermined thresholds, and the like, in advance. Further, the volatile memory temporarily stores a read program or processing data.

The control unit 62 includes a rotor temperature estimation unit 62$a$, an electric power source cutoff time identification unit 62$b$, a start-up temperature estimation unit 62$c$, and an electric motor control unit 62$d$. The control apparatus 60 receives signals indicating the rotation angle θ and rotation speed N of the rotor 14, a signal indicating the voltage Vb of the battery 20, a signal indicating the V-phase current Iv, a signal indicating the W-phase current Iw, a signal indicating the coil temperature Tst, a signal indicating the temperature Tr of the coolant 21, a signal indicating electric power source cutoff time, and a signal indicating a command torque, from the resolver 18, the voltage sensor 33, current sensors 36 and 37, the first temperature sensor 17, the second temperature sensor 25, the vehicle electric power switch 3, the timer 5, and the accelerator sensor 8.

The control apparatus 60 controls equipment such as the electric motor 10 based on the received plurality of signals indicating physical quantities and a program and information stored in the storage unit 64. For example, by outputting a PWM signal to the inverter 30 based on signals from the first and second temperature sensors 17 and 25, a signal from the resolver 18, and the program and information stored in the storage unit 64, the control apparatus 60 controls a current supplied to the electric motor 10 and controls torque generated by the electric motor 10. Operations of the rotor temperature estimation unit 62a, the electric power source cutoff time identification unit 62b, the start-up temperature estimation unit 62c, and the electric motor control unit 62d will be described in detail using FIGS. 2 to 13 below.

Figure 2:
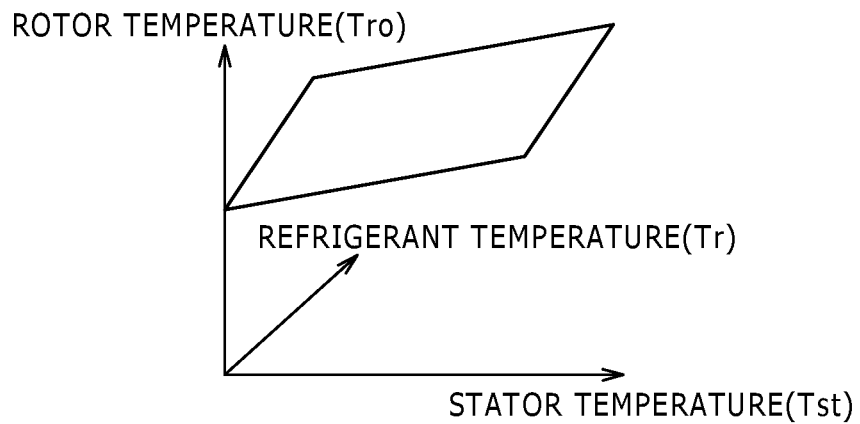
FIG. 2 is a graph illustrating a method for identifying rotor temperature by a control apparatus of a comparative example.
Figure 3:
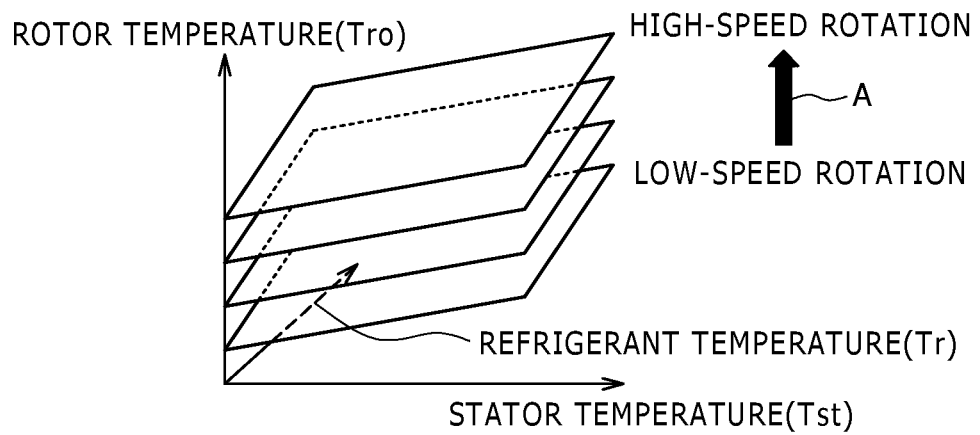
FIG. 3 is a graph indicating a relationship between rotor temperature identified by a control apparatus for the electric vehicle and rotation speed of a rotor.

Next, a method for estimating rotor temperature by the control apparatus 60 of the present disclosure will be described, using FIGS. 2 to 4. FIG. 2 is a graph illustrating a method for identifying rotor temperature by a control apparatus of a comparative example; and FIG. 3 is a graph indicating a relationship between rotor temperature identified by the control apparatus 60 and rotation speed of the rotor 14. When $A_0$, $B_0$ and $C_0$ are constants, Tro indicates temperature of the rotor estimated by the control apparatus of the comparative example, Tst indicates detected temperature of the coil 13 detected by the first temperature sensor 17, and Tr indicates refrigerant temperature (coolant temperature) detected by the second temperature sensor 25, the control apparatus of the comparative example estimates Tro based on the following formula (1).

$$Tro = A_0 \cdot Tr + B_0 \cdot Tst + C_0 \quad (1)$$

That is, in the control apparatus of the comparative example, Tro is positioned on one plane in three-dimensional space with Tro, Tst and Tr as the Z-axis, X-axis and Y-axis as shown in FIG. 2, and is uniquely identified when Tst and Tr are decided.

In comparison, the control apparatus 60 of the present disclosure is adapted to estimate Tro based on the following formula (2) when $A_1$, $B_1$ and $C_1$ are constants, Tro indicates temperature of the rotor estimated by the control apparatus 60, Tst indicates detected temperature of the coil 13 detected by the first temperature sensor 17, Tr indicates refrigerant temperature (coolant temperature) detected by the second temperature sensor 25, and N indicates the rotation speed N of the rotor 14 detected by the resolver 18. Note that $C_1$ is a positive constant, and $C_1 > 0$ is satisfied.

$$Tro = A_1 \cdot Tr + B_1 \cdot Tst + C_1 \cdot N \quad (2)$$

That is, as shown in FIG. 3, in the control apparatus 60 of the present disclosure, Tro is not positioned only on one plane that is stationary in the three-dimensional space with Tro, Tst, and Tr as the Z-axis, the X-axis and the Y-axis. When the value of the rotation speed N increases, the plane on which Tro is positioned moves to the upper side indicated by an arrow A in the three-dimensional space, and the estimated temperature of the rotor 14 increases. On the contrary, when the value of the rotation speed N decreases, the plane on which Tro is positioned moves to the lower side in the three-dimensional space, and the estimated temperature of the rotor 14 decreases.

Figure 4:
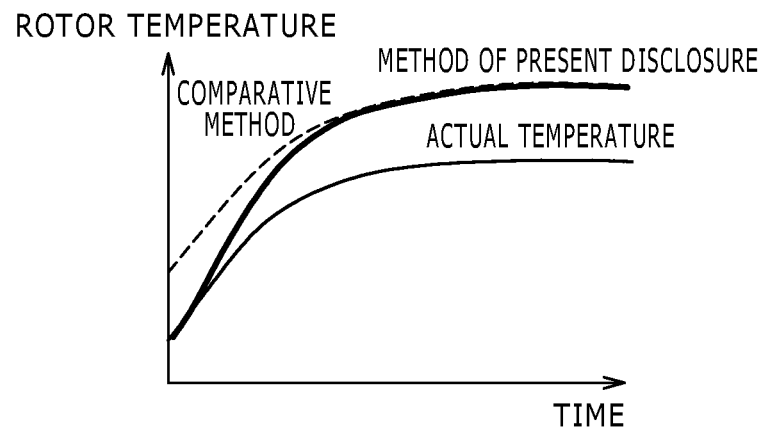
FIG. 4 is a graph showing a relationship among the actual temperature of the rotor, the temperature of the rotor identified by the control apparatus, and the temperature of the rotor identified by the control apparatus of the comparative example when the rotor is rotating at a high speed.

FIG. 4 is a graph showing a relationship among the actual temperature of the rotor 14, the estimated temperature of the rotor 14 estimated by the control apparatus 60, and the estimated temperature of the rotor 14 estimated by the control apparatus of the comparative example when the rotor 14 is rotating at a high speed. Further, FIG. 5 is a graph showing a relationship among the actual temperature of the rotor 14, the estimated temperature of the rotor 14 estimated by the control apparatus 60, and the estimated temperature of the rotor 14 estimated by the control apparatus of the comparative example when the rotor 14 is rotating at a low speed.

As shown in FIG. 4, in a high-speed rotation range, the estimated temperature of the rotor 14 estimated using the method of the present disclosure substantially corresponds to the actual temperature of the rotor 14 in the initial period from measurement starting time, while the estimated temperature of the rotor 14 estimated using the method of the comparative example is higher than the actual temperature of the rotor 14. Therefore, in the initial period from the measurement starting time in the high-speed rotation range, the actual temperature of the rotor 14 can be estimated with a higher accuracy by the method of the present disclosure than by the method of the comparative example. Further, the method of the present disclosure and the method of the comparative example have a tendency that, when time passes after the measurement starting time, the estimated temperatures of the rotor 14 substantially correspond to each other, and the estimated temperatures are higher than the actual temperature of the rotor 14 to the same extent.

Figure 5:
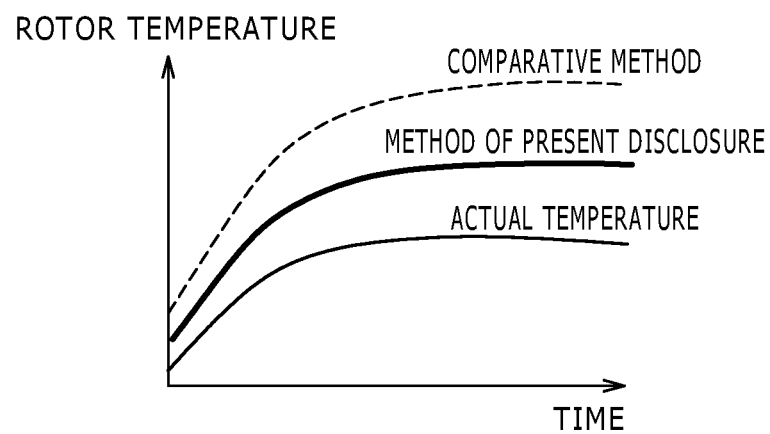
FIG. 5 is a graph showing a relationship among the actual temperature of the rotor, the temperature of the rotor identified by the control apparatus, and the temperature of the rotor identified by the control apparatus of the comparative example when the rotor is rotating at a low speed.

In comparison, as shown in FIG. 5, in a low-speed rotation range, the estimated temperature of the rotor 14 estimated using the method of the comparative example is significantly higher than the actual temperature of the rotor 14 in all the periods from the measurement starting time. On the other hand, though the estimated temperature of the rotor 14 estimated using the method of the present disclosure is higher than the actual temperature of the rotor 14 in all the periods from the measurement starting time, the difference from the actual temperature is significantly reduced to about half of the difference from the actual temperature in the case of using the method of the comparative example in all the periods from the measurement starting time. Therefore, in the low-speed rotation range, it is possible to accurately estimate the temperature of the rotor 14 by estimating the temperature of the rotor 14 using the method of the present disclosure, in comparison with estimating the temperature of the rotor 14 using the method of the comparative example.

Figure 6:
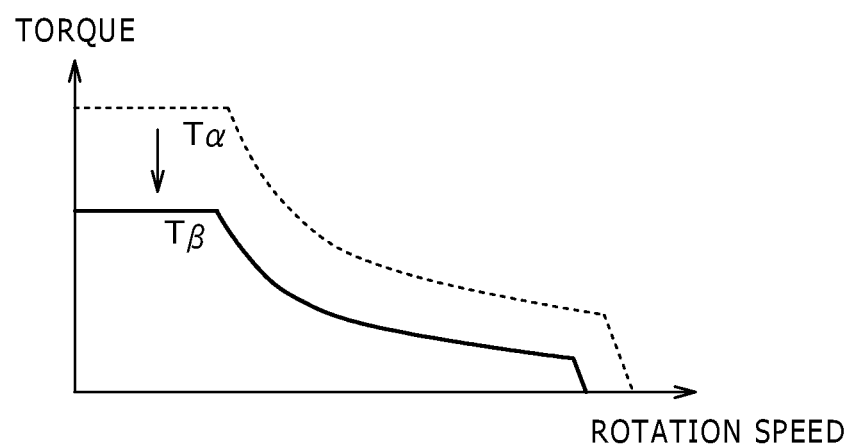
FIG. 6 is a graph indicating a relationship between a rotation speed of an electric motor and the maximum torque that the electric motor is allowed to generate for each rotation speed.

Next, description will be given on a reason why the method of the present disclosure is superior to the method of the comparative example in performance of estimating the temperature of the rotor 14 in the low-speed rotation range. FIG. 6 is a graph indicating a relationship between a rotation speed of the electric motor 10 and the maximum torque that the electric motor 10 is allowed to generate for each rotation speed. Note that in FIG. 6, the dotted line is a line indicating a relationship between a rotation speed and the maximum torque when the temperature of the rotor 14 is $T\alpha°$ C., and the solid line is a line indicating a relationship between a rotation speed and the maximum torque when the temperature of the rotor 14 is $T\beta°$ C. ($T\beta > T\alpha$).

It is known that when the electric motor 10 is driven at a high temperature, or when the electric motor 10 is caused to generate torque higher than an allowable torque, the magnetic flux decreases due to fluctuation and inversion of a magnetic moment by thermal vibration, and demagnetization occurs in which the magnetic flux does not recover to the previous state. A reason why the solid line is positioned below the dotted line is that, when the temperature of the electric motor 10 is high, demagnetization occurs with a smaller generated torque.

As shown in FIG. 6, torque allowed to be generated decreases as the rotation speed of the electric motor 10 increases. That is, when the rotation speed of the electric motor 10 increases, it becomes necessary to limit the maximum value of torque generated by the electric motor 10. In such a background, in the method of the comparative example, that is, the method of estimating the temperature of the rotor 14 without consideration of the rotation speed of the electric motor 10, it is necessary to limit the torque generated by the electric motor 10, on the assumption that the rotation speed is high even when the rotation speed is low, in order not to cause demagnetization. As a result, in the method of the comparative example, generated torque is excessively limited even in the low-speed rotation range where a high torque is allowed. Therefore, it is not possible to make full use of the performance of the electric motor 10 in the low-speed rotation range, and it is not possible to cause the electric motor 10 to be efficiently driven in the low-speed rotation range.

In comparison, in the method of the present disclosure, the temperature of the rotor 14 is estimated in consideration of the rotation speed of the electric motor 10. Therefore, as shown in FIG. 5, in the low-speed rotation range the estimated temperature of the rotor 14 can be a temperature that is significantly lower than the estimated temperature of the method of the comparative example, and that is higher than the actual temperature of the rotor 14. As a result, it is possible to significantly increase the maximum torque that can be generated in the low-speed rotation range, and it is possible to cause the electric motor 10 to be very efficiently driven.

In the electric vehicle 1, the electric motor 10 is caused to operate at a high-speed rotation in limited cases, such as travel on an expressway. In normal travel, that is, in travel in town and the like, the electric motor 10 is often caused to operate at a low-speed rotation. Therefore, by mounting the control apparatus 60 of the present disclosure on a vehicle (which is not limited to the electric vehicle 1 but may be a hybrid car), it is possible to significantly increase the maximum torque that can be generated in the low-speed rotation range that occupies during travel, and it is possible to cause the electric motor 10 to be very efficiently driven and acquire remarkable operation and effects.

Figure 7:
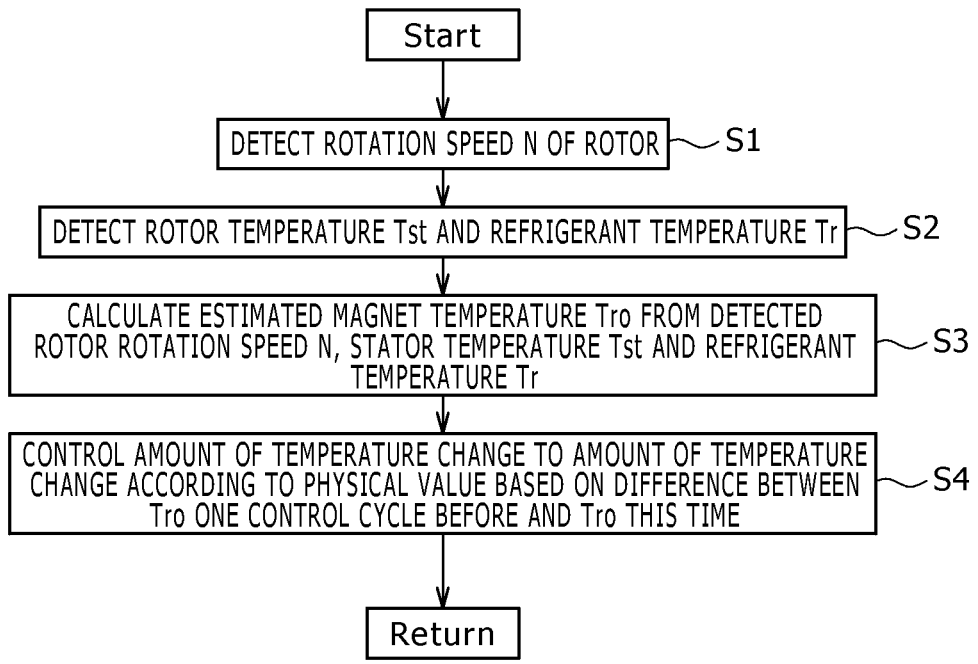
FIG. 7 is a flowchart illustrating a procedure for estimating the temperature of the rotor in the electric vehicle.

FIG. 7 is a flowchart illustrating a procedure for estimating the temperature of the rotor 14 in the electric vehicle 1. Referring to FIG. 7, when the electric vehicle 1 is started up, and electric power is supplied to the electric motor 10, the flow shown in FIG. 7 starts. At step S1, the resolver 18 detects the rotation speed N of the rotor 14. At the subsequent step S2, the first temperature sensor 17 detects the coil temperature Tst, and the second temperature sensor 25 detects the refrigerant temperature Tr. At the subsequent step S3, the rotor temperature estimation unit 62a of the control apparatus 60 calculates the temperature Tro of the rotor 14 (corresponding to the temperature of the permanent magnets 15) based on the rotation speed N, the coil temperature Tst, the refrigerant temperature Tr, and the above formula (2) stored in the storage unit 64. At the subsequent step S4, the rotor temperature estimation unit 62a adjusts the amount of temperature change to an amount of temperature change according to a physical amount from the temperature Tro estimated the last time, that is, Tro one control cycle before, and the temperature Tro calculated at step S3, to decide the estimated temperature Tro of the rotor 14 this time.

The adjustment can be performed, for example, using filtering, rate limit processing, moving average processing or the like. By performing the adjustment, the temperature Tro of the rotor 14 is prevented from rising sharply from the estimated value last time. In the case of performing filtering, the final estimated temperature Tro of the rotor 14 this time may be decided based on the temperature Tro calculated at step S3 and the temperature Tro of the rotor 14 estimated last time, for example, using a publicly known Kalman filter or the like.

In the case of performing rate limit processing, a linear function is defined. Then, when the temperature change rate of Tro calculated at step S3 to the estimated temperature Tro last time exceeds the change rate of the linear function, the temperature change rate of the final estimated temperature Tro this time to the estimated temperature Tro last time is replaced with the change rate of the linear function. In the moving average processing, the final estimated temperature Tro this time is estimated not by using only the temperature Tro last time, but by calculating an average among a plurality of temperatures Tro before this time and Tro calculated at step S3.

The adjustments require at least the estimated temperature Tro last time, but the estimated temperature Tro last time does not exist at the time of the first temperature estimation after the electric vehicle 1 is driven. In such a case, for example, the coil temperature detected by the first temperature sensor 17 may be set as the estimated temperature Tro at the time of being driven (at the time of the power source being turned on), or the refrigerant temperature detected by the second temperature sensor 25 may be set as the estimated temperature Tro at the time of being driven. However, the estimated temperature Tro at the time of being driven may be highly accurately estimated. A method for estimating such an estimated temperature Tro at the time of being driven will be described later in detail.

The adjustment of the amount of temperature change is performed for the following reason. For example, w % ben a wheel spin occurs in a case where a driver instantaneously steps on the accelerator too much by mistake, the rotation speed increases sharply only for a moment, and the estimated temperature of the rotor 14 instantaneously increases accompanying that. However, the actual temperature of the rotor 14 does not increase only by the rotation speed of the rotor 14 increasing only for a moment. The adjustment of the amount of temperature change is performed to exclude such a case.

Figure 8:
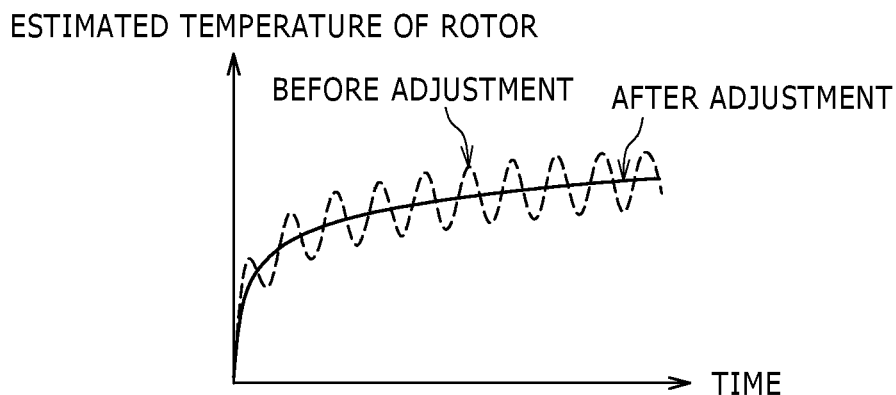
FIG. 8 is a diagram illustrating an overview of change in the estimated temperature of the rotor before and after temperature adjustment at step S4 in FIG. 7.

FIG. 8 is a diagram illustrating an overview of change in the estimated temperature before and after the temperature adjustment at step S4. Note that in FIG. 8, the broken line indicates estimated temperature before the temperature adjustment at step S4, and the solid line indicates estimated temperature after the temperature adjustment at step S4. As shown in FIG. 8, by performing step S4, it is possible to reduce local unevenness in the graph indicating fluctuation of estimated temperature relative to time, smooth the graph, and increase the accuracy of the estimated temperature.

Figure 9:
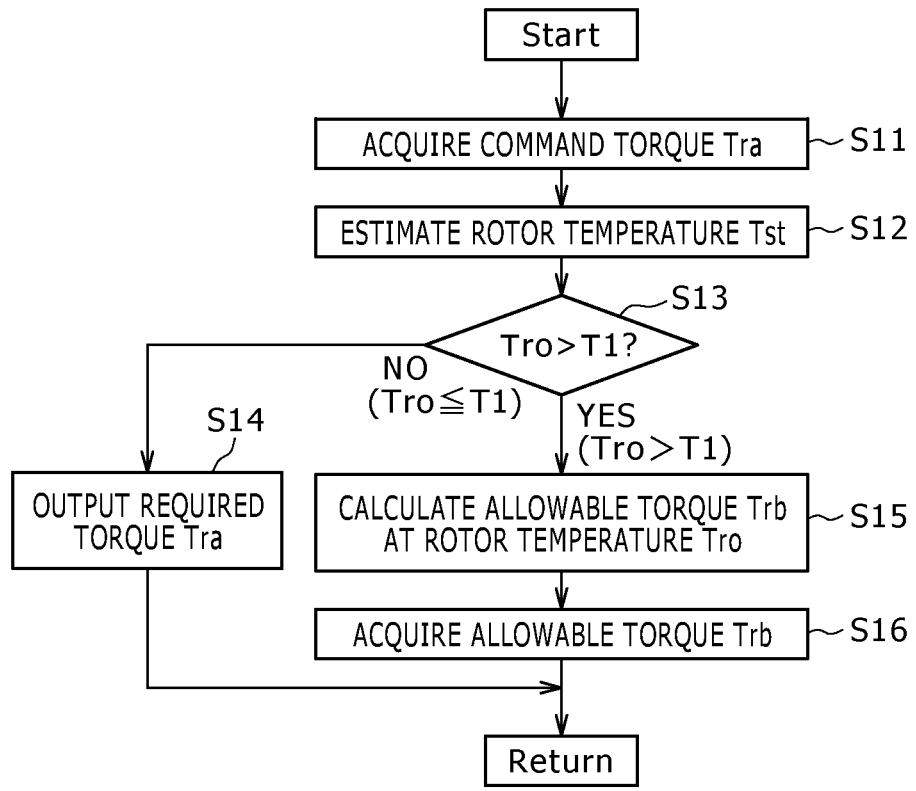
FIG. 9 is a flowchart illustrating an operation procedure at the time of the control apparatus controlling an output characteristic of the electric motor.

Next, control of the electric motor 10 by the control apparatus 60 will be described. FIG. 9 is a flowchart illustrating an operation procedure at the time of the control apparatus 60 controlling the output characteristic of the electric motor 10. Referring to FIG. 9, when the electric vehicle 1 is started up, and electric power is supplied to the electric motor 10, the flow of FIG. 9 starts. At step S11, the electric motor control unit 62d acquires a command torque Tra, for example, based on a signal from the accelerator sensor 8 (see FIG. 1). At the subsequent step S12, the rotor temperature estimation unit 62a estimates the temperature of the rotor 14 by the procedure described using FIG. 7, and the flow transitions to step S13.

At step S13, the electric motor control unit 62d judges whether the temperature Tro of the rotor 14 estimated by the rotor temperature estimation unit 62a is higher than a temperature threshold T1 stored in the storage unit 64. If a negative judgment is made at step S13, and the electric motor control unit 62d judges that the temperature Tro is below the temperature threshold T1, the flow transitions to step S14, where the electric motor control unit 62d outputs a PWM signal for generating a torque Tra, to the inverter 30, and the electric motor 10 generates the torque Tra. After that, the control returns, and step S11 and the subsequent steps are repeated.

Figure 10:
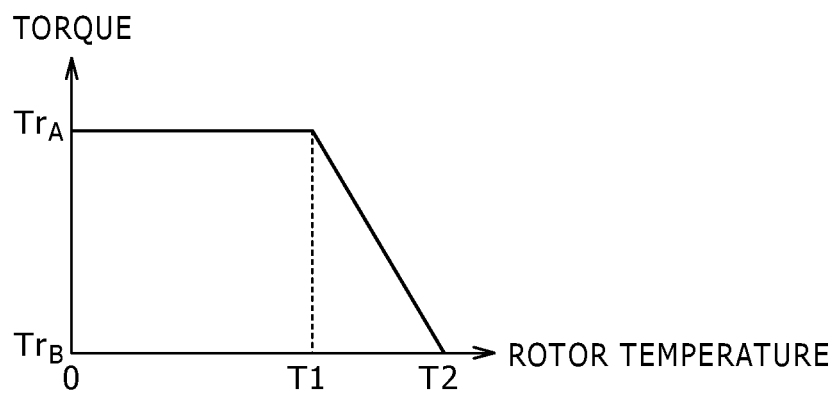
FIG. 10 is a graph indicating an example of a relationship between temperature and torque, which can be used as a torque limit map, and is a graph indicating a relationship between temperature and the maximum torque that can be generated at the temperature.

On the other hand, if a positive judgment is made at step S13, and the electric motor control unit 62d judges that the temperature Tro has exceeded the temperature threshold T1, the flow transitions to step S15, where an allowable torque Trb at the estimated temperature Tro of the rotor 14 is calculated. Specifically, the allowable torque Trb is calculated using a torque limit map. FIG. 10 is a graph indicating an example of a relationship between temperature and torque, which can be used as a torque limit map, and is a graph indicating a relationship between temperature and the maximum torque that can be generated at the temperature. In FIG. 10, TrA indicates the maximum torque that can be generated by the electric motor 10, and TrB indicates a limit torque at the time when the estimated temperature of the rotor 14 is T2. Further, T1 indicates a torque limit starting temperature.

In the example shown in FIG. 10, the maximum value TrA of torque generated by the electric motor 10 is the maximum torque that the electric motor 10 can generate until the temperature of the rotor 14 reaches the temperature threshold T1. On the other hand, when the temperature of the rotor 14 exceeds the temperature threshold T1, the maximum value of torque generated by the electric motor 10 decreases according to a linear function as temperature increases. By using the torque limit map, it is possible to limit the maximum torque that can be generated in a range where the estimated temperature of the rotor 14 is high, by simple control, and it is possible to reliably prevent demagnetization of the permanent magnets 15 embedded and fixed to the rotor 14.

Note that description has been given for a case where, when the temperature of the rotor 14 exceeds the temperature threshold T1, the maximum value of torque generated by the electric motor 10 decreases according to a linear function as temperature increases. However, when the temperature of the rotor 14 exceeds the temperature threshold T1, the maximum value of the torque generated by the electric motor 10 may decrease according to any function other than a linear function as temperature increases. For example, when the temperature of the rotor 14 exceeds the temperature threshold T1, the maximum value of the torque generated by the electric motor 10 may decrease according to such a broken-line function that has a leveling off as temperature increases, or may decrease according to a quadratic or higher-order function.

Returning to the flowchart shown in FIG. 9 again, at step S16 after step S15, the electric motor control unit 62d outputs a PWM signal for generating the torque Trb calculated at step S15, to the inverter 30, and the electric motor 10 generates the torque Trb. After that, the control returns, and step S11 and the subsequent steps are repeated. The control of the electric motor 10 shown in FIG. 9 ends, for example, when the electric vehicle 1 reaches a destination, and electric power to the electric motor 10 is cut off.

Next, description will be given of control of the electric motor 10 for the first cycle at the time of starting up the electric vehicle 1 after the electric power source for the electric vehicle 1 is cut off (after supply of electric power to the electric motor 10 from the battery 20 is cut off). As described above, at the time of performing filtering or rate limit processing at the time of smoothing the estimated temperature of the rotor 14, it is necessary to refer to an estimated temperature for a previous control cycle. However, the initial temperature to be referred to does not exist in the first cycle at the time of starting up the electric vehicle 1, and it is necessary to estimate the initial temperature.

Figure 11:
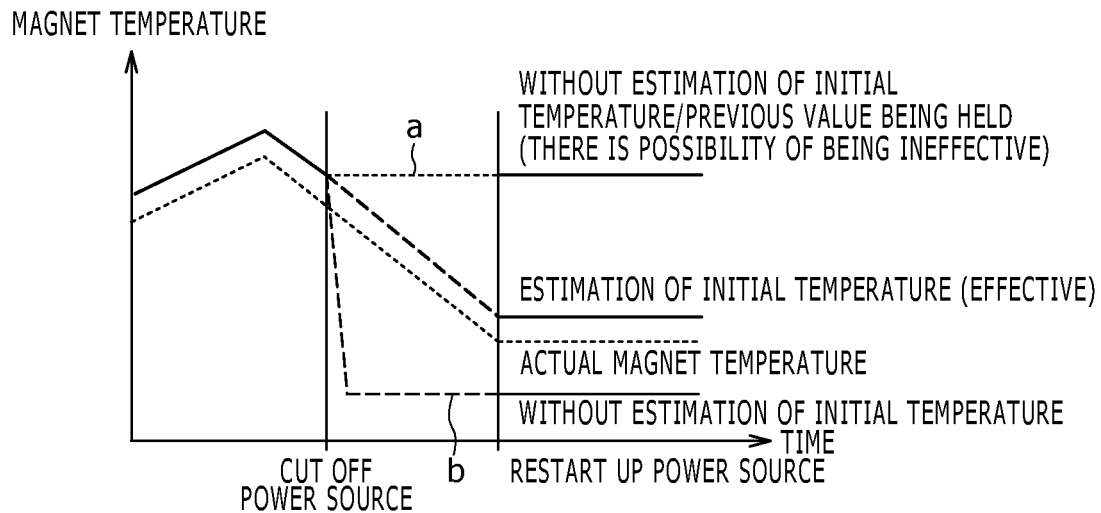
FIG. 11 is a graph showing correlation between magnet temperature and electric power source cutoff time during which an electric power source for the electric motor is cut off.

In the control apparatus 60, the start-up temperature estimation unit 62c estimates the initial temperature of the rotor 14 as follows. As shown in FIG. 11, that is, as shown by a relationship between the magnet temperature of the permanent magnets 15 of the rotor 14 and the electric power source cutoff time during which the electric power source for the electric motor 10 is cut off, there is correlation between magnet temperature and the electric power source cutoff time. The start-up temperature estimation unit 62c estimates the initial temperature of the rotor 14 to be referred to at the time of restarting the electric vehicle 1, based on information about the estimated temperature Tro of the rotor 14 immediately before electric power source cutoff is executed, information about electric power source cutoff time from the timer 5, and map information defining correlation between the magnet temperature and the electric power source cutoff time, which is stored in the storage unit 64 in advance.

According to the technique of the present disclosure, it is possible to accurately estimate the initial temperature of the rotor 14 to be referred to at the time of restarting up the electric vehicle 1, using the start-up temperature estimation unit 62c. Therefore, unlike the case of holding the last time value without estimating the initial temperature of the permanent magnets, like the line indicated by "a" in FIG. 11, the estimated temperature of the permanent magnets 15 does not become excessively higher than the actual temperature, and it is easy to cause the electric motor 10 to operate efficiently from w % ben the electric motor 10 is restarted up. Further, unlike the case of causing the initial temperature of the permanent magnets to be a constant temperature without estimation, like the line indicated by "b" in FIG. 11, it is possible to prevent the estimated temperature of the permanent magnets 15 from being lower than the actual temperature and protect the magnetic force of the permanent magnets 15.

Figure 12:
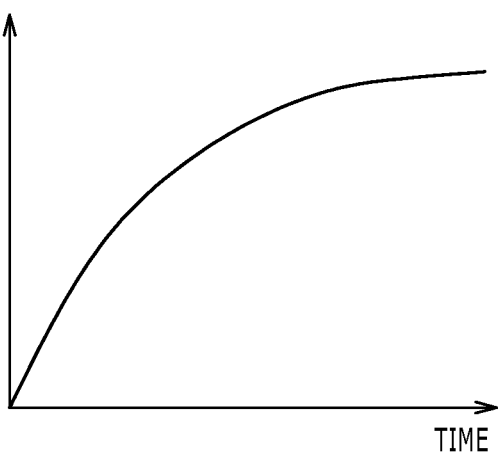
FIG. 12 is a graph showing correlation between the electric power source cutoff time and temperature change values of a stator or refrigerant.

Note that though description has been given for the case of estimating the electric power source cutoff time using the timer 5, the electric power source cutoff time may be estimated from the amount of temperature change of the first temperature sensor 17 that detects the temperature of the stator 12, the second temperature sensor 25 that detects the refrigerant temperature, or any of other various kinds of temperature sensors mounted on the electric vehicle 1. Description will be given of a case where a detected value of the first temperature sensor 17 or the second temperature sensor 25 is used, as an example. As shown in FIG. 12, there is correlation between the electric power source cutoff time and a value of temperature change of the stator 12 or the refrigerant. Therefore, by detecting the value of temperature change by the first temperature sensor 17 or the second temperature sensor 25, the electric power source cutoff time can be estimated. Therefore, since the initial temperature can be estimated without using the timer 5, the timer 5 may be deleted to reduce the manufacturing cost.

Note that the initial temperature of the rotor 14 may be estimated using only one of detected temperatures of the first temperature sensor 17 and the second temperature sensor 25. However, by calculating an average of a plurality of initial temperatures of the rotor 14 estimated based on detected values of a plurality of sensors and setting the average value as the initial temperature, it is easy to reduce the difference between the initial temperature and the actual temperature of the rotor 14 at the time of restarting up the electric power source, and to highly accurately estimate the initial temperature of the rotor 14.

Next, description will be given of a method for the control apparatus 60 to control the drive condition of the electric motor 10 using an estimated rotor temperature. The method for the control apparatus 60 to control the output characteristic of the electric motor 10 using an estimated rotor temperature has been described using FIG. 9 described above. However, the control apparatus 60 may control the drive condition of the electric motor 10 using an estimated rotor temperature.

Figure 13:
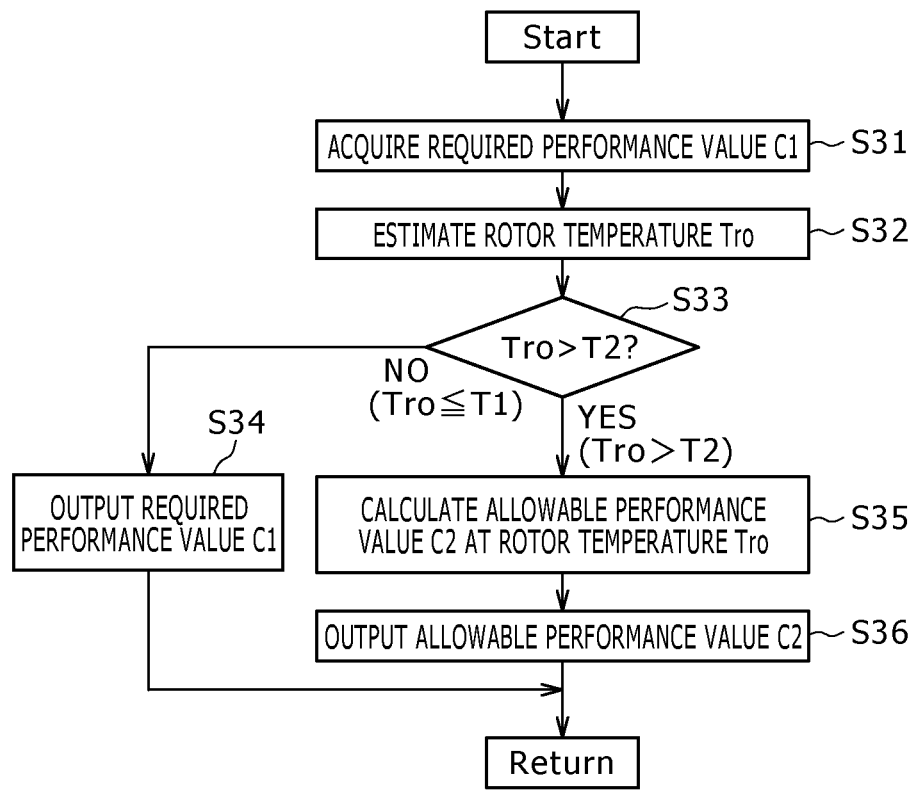
FIG. 13 is a flowchart illustrating an operation procedure at the time of the control apparatus controlling a drive condition of the electric motor.

Specifically, as shown in FIG. 13, that is, as shown in a flowchart illustrating an operation procedure at the time of the control apparatus 60 controlling the drive condition of the electric motor 10, when the flow starts by the electric vehicle 1 being started up and electric power being supplied to the electric motor 10, the control apparatus 60 may acquire a required performance value C1 at step S21. Here, the required performance value C1 may include, for example, one or more of a voltage applied to the electric motor 10, a carrier frequency that decides a pulse width modulation cycle in PWM control, an amount of oil to be circulated by on/off control of a starting switch for the electric oil pump 23, an amount of cooling air flow based on the duty ratio of a radiator fan, an amount of cooling water circulation based on the duty ratio of a water pump, and an amount of air that passes through the vehicle based on opening/closing of a grill shutter.

At the subsequent step S22, the rotor temperature estimation unit 62a estimates the temperature of the rotor 14 using the procedure described using FIG. 7, and the flow transitions to step S23. At step S23, the control apparatus 60 judges whether the temperature Tro of the rotor 14 estimated by the rotor temperature estimation unit 62a is higher than a temperature threshold T2 stored in the storage unit 64. If a negative judgment is made at step S23, and the control apparatus 60 judges that the temperature Tro is equal to or lower than the temperature threshold T2, the flow transitions to step S24, where the control apparatus 60 performs control to realize the required performance value C1. After that, the control returns, and step S21 and the subsequent steps are repeated.

On the other hand, if a positive judgment is made at step S23, and the control apparatus 60 judges that the temperature Tro has exceeded the temperature threshold T2, the flow transitions to step S25, where a required performance value C2 at the estimated temperature Tro of the rotor 14 is calculated. Specifically, an allowable voltage value, an allowable carrier frequency, whether the electric oil pump 23 is to be driven or not, an allowable duty ratio of the radiator fan, an allowable duty ratio of the water pump, and whether the grill shutter is to be opened or not, are calculated or decided, using at least one of a program, data, and map stored in the storage unit 64. At step S26 after step S25, the control apparatus 60 performs control to realize the required performance value C2. After that, the control returns, and step S21 and the subsequent steps are repeated.

By decreasing voltage applied to the electric motor 10, Joule heat generated by the electric motor 10 can be reduced, and therefore the temperature of the electric motor 10 can be decreased. Further, the temperature of the electric motor 10 can be also decreased by changing the allowable carrier frequency, driving the electric oil pump 23, increasing the allowable duty ratio of the radiator fan, increasing the allowable duty ratio of the water pump, or opening the grill shutter. Therefore, by performing the control, it is possible to increase the maximum value of torque that can be generated by the electric motor 10, and in particular, it is possible to significantly increase the maximum value of torque that can be generated in the low-speed rotation range and cause the electric motor 10 to operate efficiently.

As described above, the control apparatus 60 of the present disclosure controls the electric motor 10 mounted on the electric vehicle 1. Further, the control apparatus 60 is a control apparatus including: the rotor temperature estimation unit 62a estimating a temperature of the rotor 14 based on stator temperature information from the first temperature sensor (stator temperature identification unit) 17 for identifying the temperature of the stator 12, refrigerant temperature information from the second temperature sensor (refrigerant temperature identification unit) 25 for identifying the temperature of refrigerant used to cool the electric motor 10, and rotation speed information about the rotor 14 from the resolver (rotation speed identification unit) 18 for identifying the rotation speed of the rotor 14, and the electric motor control unit 62d controlling at least one of the output characteristic and the drive condition of the electric motor 10 based on the temperature of the rotor 14 estimated by the rotor temperature estimation unit 62a.

According to the present disclosure, the control apparatus 60 controls at least one of the output characteristic and the drive condition of the electric motor 10 in consideration of the rotation speed of the rotor 14 in addition to the stator temperature information and the refrigerant temperature information. Therefore, it is possible to prevent output from being excessively limited when the electric motor 10 is rotating at a low speed, and it is possible to cause the electric motor 10 to operate efficiently at both the time of rotating at a low speed and the time of rotating at a high speed.

Further, the rotor 14 may include the permanent magnets 15. As described using FIGS. 9 and 10, the control unit 62 may control at least one of the output characteristic and the drive condition of the electric motor 10 so that the permanent magnets 15 are not demagnetized, based on the temperature of the rotor 14.

According to the present configuration, it is possible to effectively control or prevent demagnetization of the permanent magnets 15 of the rotor 14.

Further, the control apparatus 60 may include: the electric power source cutoff time identification unit 62b identifying electric power source cutoff time during which the electric power source for the electric vehicle 1 is cut off; and the start-up temperature estimation unit 62c estimating the temperature of the rotor 14 at the time of energizing the electric vehicle 1 for which the electric power source cutoff time has ended, based on the electric power source cutoff time and a temperature of the rotor 14, estimated by the rotor temperature estimation unit 62a, immediately before cutting off the electric power source.

According to the present configuration, it is possible to estimate the temperature of the rotor 14 at the time of the vehicle being started up. Therefore, it is possible to cause the electric motor 10 to operate efficiently from when the vehicle is started up, and it is possible to cause the electric motor 10 to output a high torque from when the vehicle is started up. Therefore, it is possible to realize a motive power mechanism that is superior in responsiveness to an operation from when the vehicle is started up.

Further, though it is possible to estimate the temperature of the rotor 14 using filtering, rate limit processing, or the like if a previous estimated temperature of the rotor 14 can be identified, when the vehicle is started up, the previous estimated temperature of the rotor 14 does not exist, and the temperature of the rotor 14 cannot be highly accurately estimated. In comparison, according to the present configuration, it is possible to estimate the temperature of the rotor 14 at the time of the vehicle being started up even when the vehicle is started up, and therefore, it is easy to highly accurately estimate the temperature of the rotor 14 from when the vehicle is started up.

Note that the present disclosure is not limited to the embodiment and modifications thereof, and various improvements and changes are possible within the scope of the matters described in the claims of the present application and the scope equal to the matters.

For example, in the above embodiment, the above formula (2) is used to estimate the temperature of the rotor 14, and a term proportional to the rotation speed N is added to the formula for calculating provisional Tro. However, the formula for calculating the provisional Tro may be the above formula (2) to which a constant is added. Or alternatively, the formula for calculating the provisional Tro may include a function F(N) that is defined with the rotation speed N and that is not a linear function. For example, F(N) may include a quadratic or higher-order function, or may include one or more functions among a trigonometric function, an exponential function, a logarithmic function, and special functions.

Further, description has been given for the case of controlling the output characteristic of the electric motor 10 based on the temperature of the rotor 14 estimated by the rotor temperature estimation unit 62a, using FIG. 9, and description has been given for the case of controlling the drive condition of the electric motor 10 based on the temperature of the rotor 14 estimated by the rotor temperature estimation unit 62a, using FIG. 13. However, the control apparatus of the present disclosure may control both the output characteristic, and the drive condition, of the electric motor, based on the temperature of the rotator estimated by the rotor temperature estimation unit.

Further, description has been given for the case where the stator temperature identification unit is the first temperature sensor 17, the refrigerant temperature identification unit is the second temperature sensor 25, and the rotation speed identification unit is the resolver 18. However, the stator temperature identification unit, the refrigerant temperature identification unit and the rotation speed identification unit may estimate one or more items of physical information among the temperature of the stator, the temperature of the refrigerant, and the rotation speed of the rotor, based on one or more items of physical information related to the electric motor, for example, one or more items of physical information among voltage applied to the electric motor, electric power supplied by the electric motor, a current supplied to the electric motor, the duty ratio of the radiator fan, and the duty ratio of the water pump, and software. Further, though description has been given for the case where the vehicle is the electric vehicle 1, the vehicle may be a hybrid car provided with an internal-combustion engine in addition to an electric motor.

Further, description has been given for the case where the electric motor 10 is provided with the permanent magnets 15. However, the electric motor may be an electric motor without permanent magnets, for example, an induction motor, an SR (Switched Reluctance) motor, or the like. In an electric motor, reduction in efficiency accompanying rise of conductor temperature in the rotor is generally known. Therefore, by using the technique of the present disclosure, it is possible, for example, even in an electric motor without permanent magnets, to effectively suppress or prevent efficiency reduction of the electric motor by estimating the temperature of the rotor and causing the cooling pump to operate when a certain temperature is exceeded. The temperature of the rotor of an electric motor rises due to iron loss generated by rotation, and heat received from the stator. By using the technique of the present disclosure, it is possible to reliably protect the components of an electric motor from heat damage and reliably prevent strength reduction due to temperature characteristics of a steel plate irrespective of whether the electric motor is provided with permanent magnets or not.

The invention claimed is:

1. A control apparatus for controlling an electric motor mounted on a vehicle, the control apparatus comprising:
   a rotor temperature estimation unit estimating a temperature of a rotor based on stator temperature information from a stator temperature identification unit for identifying a temperature of a stator, refrigerant temperature information from a refrigerant temperature identification unit for identifying a temperature of refrigerant used to cool the electric motor, and rotation speed information about the rotor from a rotation speed identification unit for identifying a rotation speed of the rotor;
   a control unit controlling at least one of an output characteristic and a drive condition of the electric motor based on the temperature of the rotor estimated by the rotor temperature estimation unit;
   an electric power source cutoff time identification unit identifying electric power source cutoff time during which an electric power source for the vehicle is cut off; and
   a start-up temperature estimation unit estimating a temperature of the rotor at the time of energizing the vehicle for which the electric power source cutoff time has ended, based on the electric power source cutoff time and a temperature of the rotor, estimated by the rotor temperature estimation unit, immediately before cutting off the electric power source.

2. A control apparatus for controlling an electric motor mounted on a vehicle, the control apparatus comprising:
   a rotor temperature estimation unit estimating a temperature of a rotor based on stator temperature information from a stator temperature identification unit for identifying a temperature of a stator, refrigerant temperature information from a refrigerant temperature identification unit for identifying a temperature of refrigerant used to cool the electric motor, and rotation speed information about the rotor from a rotation speed identification unit for identifying a rotation speed of the rotor;
   a control unit controlling at least one of an output characteristic and a drive condition of the electric motor based on the temperature of the rotor estimated by the rotor temperature estimation unit;

an electric power source cutoff time identification unit identifying electric power source cutoff time during which an electric power source for the vehicle is cut off; and a start-up temperature estimation unit estimating a temperature of the rotor at the time of energizing the vehicle for which the electric power source cutoff time has ended, based on the electric power source cutoff time and a temperature of the rotor, estimated by the rotor temperature estimation unit, immediately before cutting off the electric power source, wherein, the rotor includes permanent magnets; and the control unit controls at least one of the output characteristic and the drive condition of the electric motor so that the permanent magnets are not demagnetized, based on the temperature of the rotor.

3. A vehicle including a control apparatus for controlling an electric motor mounted on the vehicle, the control apparatus further comprising:

a rotor temperature estimation unit estimating a temperature of a rotor based on stator temperature information from a stator temperature identification unit for identifying a temperature of a stator, refrigerant temperature information from a refrigerant temperature identification unit for identifying a temperature of refrigerant used to cool the electric motor, and rotation speed information about the rotor from a rotation speed identification unit for identifying a rotation speed of the rotor;

a control unit controlling at least one of an output characteristic and a drive condition of the electric motor based on the temperature of the rotor estimated by the rotor temperature estimation unit;

an electric power source cutoff time identification unit identifying electric power source cutoff time during which an electric power source for the vehicle is cut off; and a start-up temperature estimation unit estimating a temperature of the rotor at the time of energizing the vehicle for which the electric power source cutoff time has ended, based on the electric power source cutoff time and a temperature of the rotor, estimated by the rotor temperature estimation unit, immediately before cutting off the electric power source.

4. A vehicle including control apparatus for controlling an electric motor mounted on the vehicle, the control apparatus further comprising:

a rotor temperature estimation unit estimating a temperature of a rotor based on stator temperature information from a stator temperature identification unit for identifying a temperature of a stator, refrigerant temperature information from a refrigerant temperature identification unit for identifying a temperature of refrigerant used to cool the electric motor, and rotation speed information about the rotor from a rotation speed identification unit for identifying a rotation speed of the rotor;

a control unit controlling at least one of an output characteristic and a drive condition of the electric motor based on the temperature of the rotor estimated by the rotor temperature estimation unit;

an electric power source cutoff time identification unit identifying electric power source cutoff time during which an electric power source for the vehicle is cut off; and a start-up temperature estimation unit estimating a temperature of the rotor at the time of energizing the vehicle for which the electric power source cutoff time has ended, based on the electric power source cutoff time and a temperature of the rotor, estimated by the rotor temperature estimation unit, immediately before cutting off the electric power source, wherein, the rotor includes permanent magnets; and the control unit controls at least one of the output characteristic and the drive condition of the electric motor so that the permanent magnets are not demagnetized, based on the temperature of the rotor.

* * * * *